US008468221B2

(12) United States Patent
Saegusa et al.

(10) Patent No.: US 8,468,221 B2
(45) Date of Patent: Jun. 18, 2013

(54) NETWORK CONFIGURATION METHOD

(75) Inventors: Takashi Saegusa, Hitachinaka (JP);
Terunobu Funatsu, Tsuchiura (JP);
Manabu Okamoto, Isesaki (JP); Ikuo Takemura, Oizumi (JP); Masaharu Yoshida, Oizumi (JP); Hideyuki Kamasuka, Ota (JP)

(73) Assignee: Hitachi High-Technologies Corporation, Tokyo (JP)

( * ) Notice: Subject to any disclaimer, the term of this patent is extended or adjusted under 35 U.S.C. 154(b) by 419 days.

(21) Appl. No.: 12/784,166

(22) Filed: May 20, 2010

(65) Prior Publication Data
US 2010/0299415 A1 Nov. 25, 2010

(30) Foreign Application Priority Data

May 25, 2009 (JP) .................................. 2009-125217

(51) Int. Cl.
*G06F 15/177* (2006.01)
(52) U.S. Cl.
USPC ........................................................ 709/220
(58) Field of Classification Search
USPC ........................... 709/201–226; 370/210–226
See application file for complete search history.

(56) References Cited

U.S. PATENT DOCUMENTS 5,847,659 A    12/1998  Mugitani
6,091,738 A *   7/2000  Tsujikado et al. ............ 370/453
6,330,241 B1 * 12/2001  Fort ............................. 370/395.1
8,176,156 B1 *  5/2012  Sullivan ......................... 709/223
2007/0081557 A1   4/2007  Binetti et al.
2008/0123523 A1 *  5/2008  Iwata et al. .................... 370/222
2008/0263248 A1 * 10/2008  Harriman ...................... 710/243

FOREIGN PATENT DOCUMENTS

JP     2005-260828 A    9/2005

OTHER PUBLICATIONS

European Search Report issued in Application No. 10163830.2 issued on Sep. 1, 2010.

* cited by examiner

*Primary Examiner* — Joseph Avellino
*Assistant Examiner* — Mark O Afolabi
(74) *Attorney, Agent, or Firm* — McDermott Will & Emery LLP

(57) ABSTRACT

A network I/O system includes a central communication unit having a communication port and a plurality of terminal communication units each having an upstream communication port and a plurality of downstream ports wherein the central communication unit transmits, to the terminal communication units, routing data of the central communication unit to the terminal communication units for setting identification numbers in the terminal communication units and data of the identification number of the terminal communication units, the terminal communication units refer to the data to transmit to the downstream communication port and set the identification number in a targeted terminal communication unit, and a communication port number of the downstream communication port is appended to routing recognition data to be transmitted from the terminal communication units to the central communication unit at a time of passing through the terminal communication units, thereby recognizing a network configuration.

3 Claims, 5 Drawing Sheets

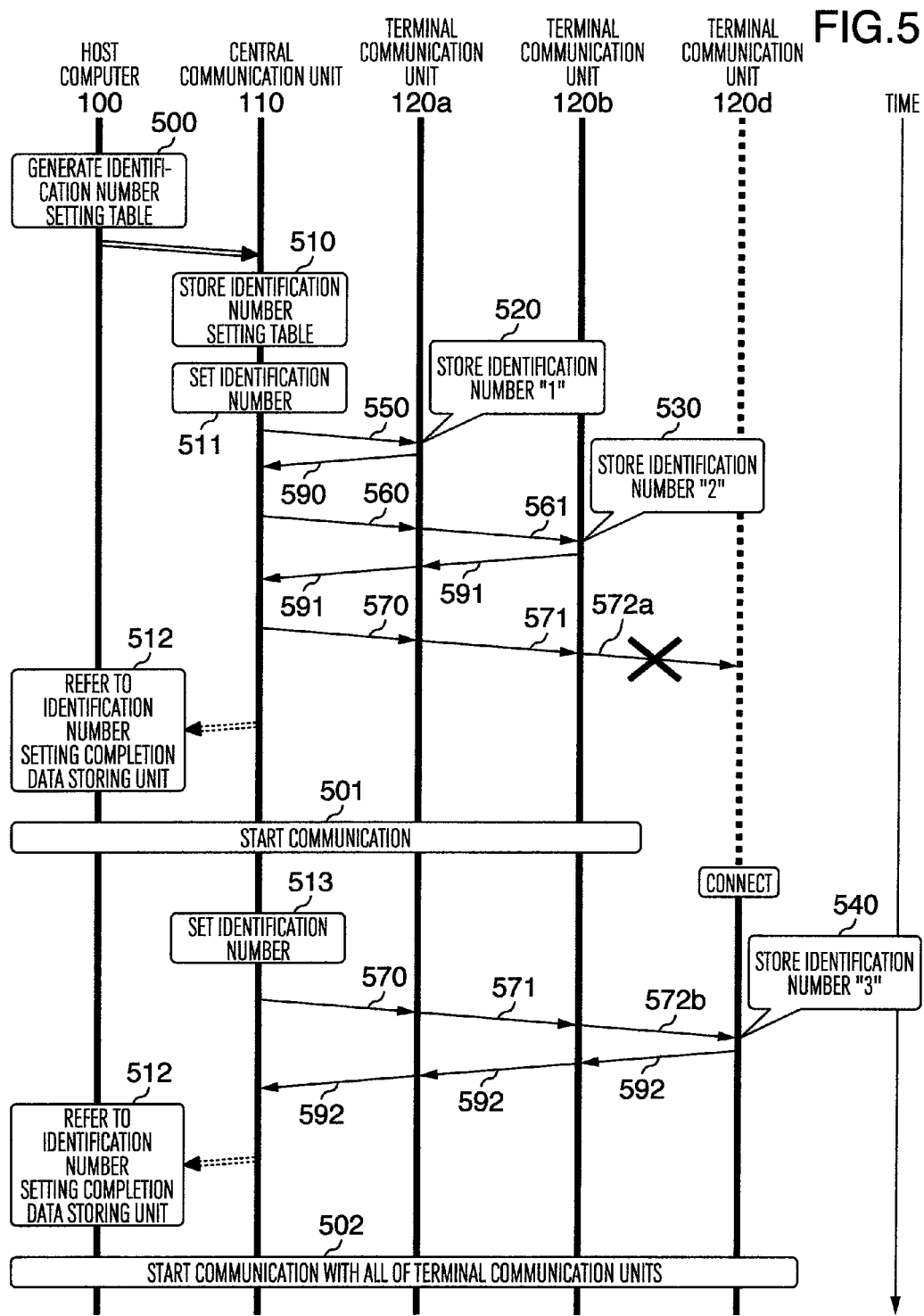

NETWORK CONFIGURATION METHOD

BACKGROUND OF THE INVENTION

The present invention relates to a network I/O system and a network configuring method in which signals at digital I/O ports corresponding to a multipoint for digitally controlling a plurality of controlled devices are multiplexed to reduce the number of wirings in an industrial machinery etc.

The network I/O system provides a host computer, a central communication unit connected with the host computer, and a plurality of terminal communication units each having digital I/O ports. The central communication unit and the plurality of terminal communication units configure a network configuration by using a multi-drop connection, a daisy-chain connection, etc.

In the past, the input/output of data between the host computer and the plurality of controlled devices such as sensors, actuators, etc. which are disposed dispersedly, has performed by connecting the controlled devices directly to the host computer, therefore, a number of wirings are required.

The network I/O system configures a network in which the host computer is connected with the plurality of dispersedly disposed controlled devices, and the signals at digital I/O ports are multiplexed to realize the data input/output between the host computer and the plurality of controlled devices by a simple connection of using a small number of wirings. This has been used mainly in the industrial field in which a number of the controlled devices are easily dispersed in such as industrial machineries for manufacturing automobiles, machine tools, chip mounters, etc.

Here, it is required to set an identification number, in the terminal communication unit, for designating a sending destination and a sending source of a communication so that the communication is performed between the host computer and the terminal communication units each connected with the controlled device.

In the past, a setting of the identification number in the terminal communication units has been performed by the following method. That is, a switch and ROM (Read-only Memory) are provided on the respective terminal communication units and non-overlapped values are assigned respectively to the terminal communication units by using the switch and ROM in manual when incorporating the network I/O system in a machine.

Here, when changing or adding a network configuration, the system must be built up correctly by not only resetting the identification number for each of the above-mentioned terminal communication units but also figuring out accurately, by a system user, a type of the controlled device connected with the respective terminal communication units and the network configuration as well as the identification number set in the terminal communication units. In the past, the following procedure has been performed in manual: confirmation of the network configuration configured by the respective terminal communication units and the type of controlled device connected with the terminal communication units; and confirmation of the identification number set in the respective terminal communication units.

For a purpose of solving the above-mentioned problem, JP-A-2005-260828 has been known as a technique for setting a MAC (Media Access Control) address as a unique address in advance when manufacturing the terminal communication unit and dynamically setting an IP (Internet Protocol) address for every communication card slot. However, in the case of the above-mentioned method, it is required to have a large load such that an address management must be maintained from when manufacturing the terminal communication unit to when transferring it to the user. Further, when a major scale configuration widely used with the MAC address etc. cannot be used, a large number of man-hour is required for setting a new unique address and for manufacturing the terminal communication unit.

SUMMARY OF THE INVENTION

One problem to be solved by the invention is that the identification number for the respective terminal communication units is directly set in manual by using the unique address, switch, ROM, etc.

The other problem to be solved by the invention is that the related art cannot dynamically recognize the identification number appended to the respective terminal communication units in the network I/O system and a connection configuration of the network, and the type of controlled devices connected with the terminal communication units.

In response to the above-mentioned problems, one object of the invention is to provide a dynamically and flexibly configuring method of the identification number for the terminal communication units on the basis of a network routing, without setting directly in manual by using the assignment of unique address, switch, ROM, etc.

The other object of the invention is to provide a dynamically recognizable system for the identification number set in the terminal communication units and the connection configuration in the network I/O system, and the type of controlled devices connected with the respective terminal communication units.

According to a first aspect of the invention, the invention provides a network I/O system comprising: a host computer; a central communication unit including a host computer interface unit, a digital I/O data storing unit, an identification number setting data storing unit, an identification number setting completion data storing unit, at least one communication port, and a central communication control unit; and a plurality of terminal communication units each including an upstream communication port, a plurality of downstream communication ports, and a terminal communication control unit, wherein the upstream communication port in a first of the terminal communication units is connected with the communication port in the central communication unit, at least one of the downstream communication ports in the first of the terminal communication units is connected with another upstream communication port in a second of the terminal communication units, and the at least one of the downstream communication ports in the second of the terminal communication units is connected with another upstream communication port in a third of the terminal communication control units, the network I/O system comprising: that in a routing through which the central communication unit is connected to the terminal communication units via the downstream communication ports in other terminal communication units, the identification number setting data storing unit in the central communication unit stores identification number setting data combined, routing data combined a port number of the downstream communication ports in the terminal communication units passed in sequence from the central communication unit on the routing by a number of the other terminal communication units connected between the central communication unit and the terminal communication unit, with the identification numbers as non-overlapped and individually set in the terminal communication units; and the terminal communication unit includes an identification number designating unit for storing the identification number in the identification number setting data received from the upstream communication port.

The identification number setting data storing unit in the central communication unit includes an identification number storing unit for storing the identification number to be set in the terminal communication unit, and a routing data storing unit for storing the routing data for every terminal communication unit from the central communication unit to the respective terminal communication units.

The terminal communication unit includes a terminal type number designating unit for storing a terminal type number uniquely determined for every type of controlled devices connected with the digital I/O port.

The central communication unit includes a terminal type data storing unit for storing the terminal type number transmitted from the terminal communication unit.

According to a second aspect of the invention, the invention provides a central communication unit for use in a network I/O system, connected with a host computer and a plurality of terminal communication units, wherein an upstream communication port in a first of the terminal communication units is connected with a communication port in the central communication unit, at least one of downstream communication ports in the first of the terminal communication units is connected with another upstream communication port in a second of the terminal communication units, and the at least one of the downstream communication ports in the second of the terminal communication units is connected with another upstream communication port in a third of the terminal communication control units, in a routing through which the central communication unit is connected to the terminal communication units via the downstream communication ports in other terminal communication units, an identification number setting data storing unit in the central communication unit stores identification number setting data combined, routing data combined a port number of the downstream communication ports in the terminal communication units passed in sequence from the central communication unit on the routing by a number of the other terminal communication units connected between the central communication unit and the terminal communication unit, with the identification numbers as non-overlapped and individually set in the terminal communication units; and the terminal communication unit includes an identification number designating unit for storing the identification number in the identification number setting data received from the upstream communication port, the central communication unit comprising: a host computer interface unit; a digital I/O data storing unit; an identification number setting data storing unit; an identification number setting completion data storing unit; at least one communication port; and a central communication control unit, wherein the identification number setting data storing unit includes an identification number storing unit and a routing data storing unit.

According to a third aspect of the invention, the invention provides a terminal communication unit for use in a network I/O system providing a central communication unit connected with a host computer and a plurality of terminal communication units, wherein an upstream communication port in a first of the terminal communication units is connected with a communication port in the central communication unit, at least one of downstream communication ports in the first of the terminal communication units is connected with another upstream communication port in a second of the terminal communication units, and the at least one of the downstream communication ports in the second of the terminal communication units is connected with another upstream communication port in a third of the terminal communication control units, in a routing through which the central communication unit is connected to the terminal communication units via the downstream communication ports in other terminal communication units, an identification number setting data storing unit in the central communication unit stores identification number setting data combined, routing data combined a port number of the downstream communication ports in the terminal communication units passed in sequence from the central communication unit on the routing by a number of the other terminal communication units connected between the central communication unit and the terminal communication unit, with the identification numbers as non-overlapped and individually set in the terminal communication units; and the terminal communication unit includes an identification number designating unit for storing the identification number in the identification number setting data received from the upstream communication port, the terminal communication unit comprising: the upstream communication port; the plurality of downstream communication ports; a terminal communication control unit; and the identification number designating unit.

The network I/O system further comprises a controller incorporating the central communication unit and a work unit incorporating the terminal communication unit and detachable from a device body.

According to a fourth aspect of the invention, the invention provides a network configuration method performed by: a host computer; a central communication unit including a host computer interface unit, a digital I/O data storing unit, an identification number setting data storing unit, an identification number setting completion data storing unit, at least one communication port, and a central communication control unit; and a plurality of terminal communication units each including at least one upstream communication port, a plurality of downstream communication ports, at least one digital I/O port, a terminal communication control unit, and an identification number designating unit, wherein the upstream communication port in a first of the terminal communication units is connected with the communication port in the central communication unit, at least one of the downstream communication ports in the first of the terminal communication units is connected with another upstream communication port in a second of the terminal communication units, and the at least one of the downstream communication ports in the second of the terminal communication units is connected with another upstream communication port in a third of the terminal communication control units, the network configuration method comprising the steps: that in a routing through which the central communication unit is connected to the terminal communication units via the downstream communication ports in other terminal communication units, the host computer stores identification number setting data combined, routing data combined a port number of the downstream communication ports in the terminal communication units passed in sequence from the central communication unit on the routing by a number of the other terminal communication units connected between the central communication unit and the terminal communication unit, with the identification numbers as non-overlapped and individually set in the terminal communication units, in the identification number setting data storing unit in the central communication unit for every terminal communication unit connected with a network; the central communication unit transmits the identification number setting data stored in the identification number setting data storing unit by a number of the terminal communication units connected with the network, to the upstream communication port in the terminal communication unit connected with the central communication unit via a communication port; the terminal communication unit refers to a value of a least significant number in the routing data in the identification number setting data received from the upstream communication port to delete the value of the least significant number if the value is the port number of the downstream communication port, transmit the identification number setting data to the downstream communication port corresponding to the port number, store the identification number in the identification number setting data in the identification number designating unit if the value is not the port number corresponding to the downstream communication port, and output identification number setting completion data indicating that the identification number is set simultaneously in the upstream communication port; and the central communication unit halts transmitting the identification number setting data of the terminal communication unit to be a sending source when receiving the identification number setting completion data.

The terminal communication unit includes a terminal type number designating unit for storing a terminal type number uniquely determined for every type of controlled devices connected with the digital I/O port; the terminal communication unit combines the terminal type number stored in the terminal type number designating unit with the terminal number stored in the identification number designating unit to transmit to the upstream communication port and transmit the received terminal type number and terminal number to the upstream communication port without change if the combined the terminal type number with the terminal number is received from the downstream communication port; the central communication unit stores apart the terminal type number of all of the terminal communication units for every identification number in the terminal type data storing unit in accordance with the received terminal type number and identification number from the communication port; and the host computer recognizes a type of the controlled devices connected with the respective terminal communication units in accordance with the terminal type number stored in the terminal type data storing unit in the central communication unit.

According to a fifth aspect of the invention, the invention provides a network configuration method performed by: a host computer; a central communication unit including a host computer interface unit, a digital I/O data storing unit, an identification number setting data storing unit, an identification number setting completion data storing unit, at least one communication port, and a central communication control unit; and a plurality of terminal communication units each including at lease one upstream communication port, a plurality of downstream communication ports, at least one digital I/O port, a terminal communication control unit, and an identification number designating unit, wherein the upstream communication port in a first of the terminal communication units is connected with the communication port in the central communication unit, the at least one of downstream communication ports in the first of the terminal communication units is connected with another upstream communication port in a second of the terminal communication units, and the at least one of the downstream communication ports in the second of the terminal communication units is connected with another upstream communication port in a third of the terminal communication control units, the network configuration method comprising the steps: that the terminal communication unit transmits routing recognition data to the upstream communication port when connecting to a network, and when receiving the routing recognition data from the downstream communication port, a communication port number of the received downstream communication port is appended to the routing recognition data to transmit to the upstream communication port; the central communication unit stores the routing recognition data, received from the communication port, of all of the terminal communication units in the routing data storing unit; and the host computer recognizes the routing data from the central communication unit to the respective terminal communication units in accordance with the routing recognition data, stored in the central communication unit, of the respective terminal communication units.

The terminal communication unit includes a terminal type number designating unit for storing a terminal type number uniquely determined for every type of controlled devices connected with the digital I/O port, transmits a combination of combining the routing recognition data with the terminal type number stored in the terminal type number designating unit to the upstream communication port when the terminal communication unit itself is connected with the network, transmits a combination of combining the communication port number of the received downstream communication port with the received routing recognition data to the upstream communication port when receiving the combination of combining the routing recognition data with the terminal type number from the downstream communication port, and the central communication unit stores the routing recognition data of all of the terminal communication units in the routing data storing unit in accordance with the routing recognition data and the terminal type number received from the communication port and stores the terminal type numbers of all of the terminal communication units in the terminal type data storing unit; and the host computer recognizes the routing data from the central communication unit to the respective terminal communication units in accordance with the routing recognition data, stored in the central communication unit, of the respective terminal communication units, and recognizes a type of the controlled devices connected respectively with the terminal communication units in accordance with the terminal type number stored in the central communication unit.

According to the invention, the assignment of unique address and the configuration of the switch, ROM, etc. are not required by appending the identification data dynamically to the terminal communication units on the basis of the network routing, so that an advantage can be obtained such that the number of man-hour caused in manual is considerably reduced at a time of manufacturing the terminal communication unit, starting up the system, and changing the connection configuration of the network.

Further, according to the invention, the configuration of network system can be recognized dynamically by the network connection configuration and the type of controlled device connected with the terminal communication units, so that the addition and change for the system can be performed easily by presenting the recognized configuration of network system to the user, and an advantage can be obtained such that a man-caused mistake is easily acknowledged in the system configuration.

The other objects, features and advantages of the invention will become apparent from the following description of the embodiments of the invention taken in conjunction with the accompanying drawings.

BRIEF DESCRIPTION OF THE DRAWINGS

FIG. 5 is an explanatory diagram for a setting procedure of an identification number in FIG. 4B;

DESCRIPTION OF THE EMBODIMENTS

Hereinafter, embodiments of the invention will be described with reference to the drawings.

First Embodiment

System Basic Configuration

Figure 1:
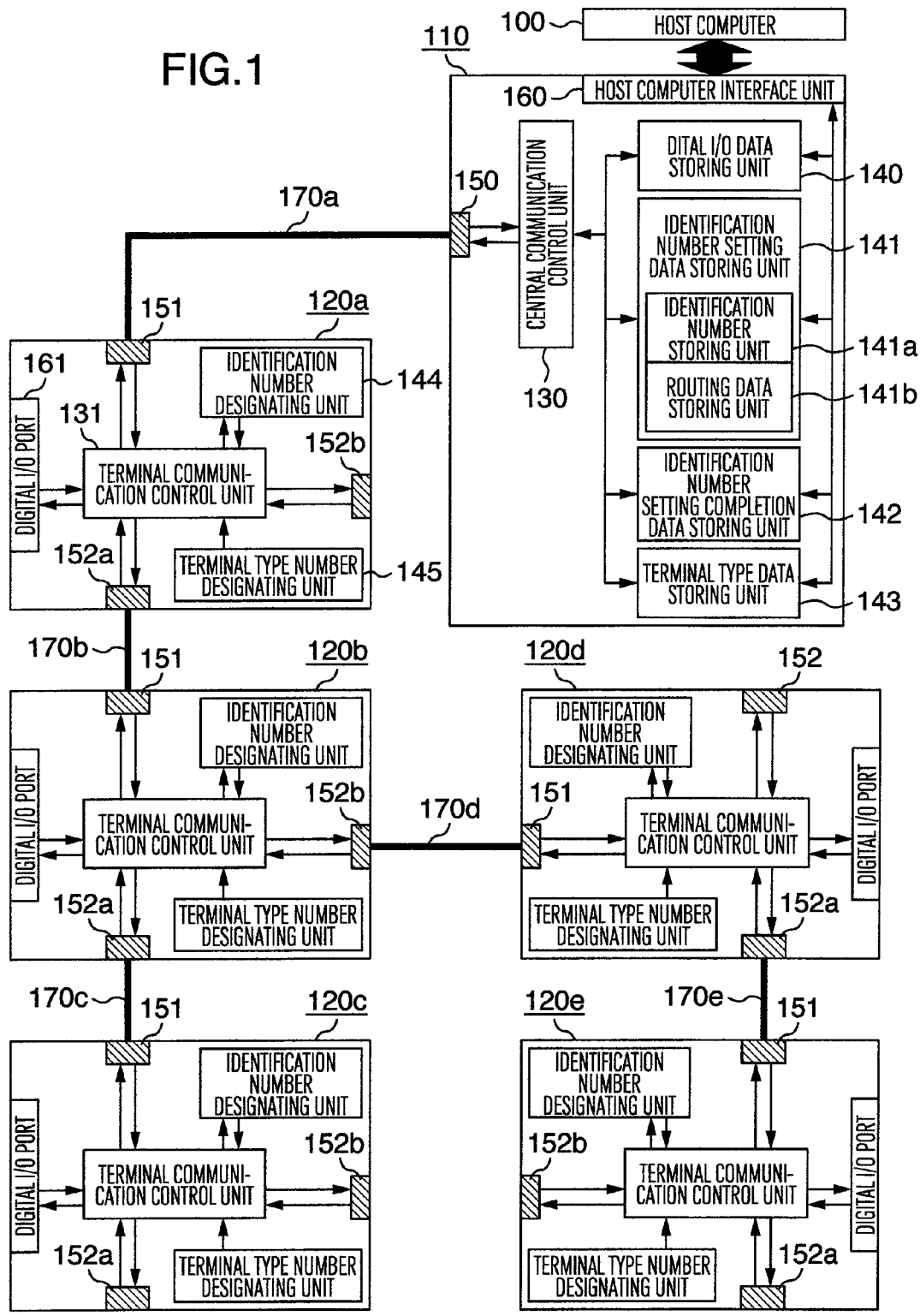
FIG. 1 is a block diagram showing a basic configuration of a network I/O system in the invention.

FIG. 1 is a block diagram showing a network I/O system in a first embodiment of the invention. The network I/O system in the invention is configured by a central communication unit 110 connected with a host computer 100 and terminal communication units 120a, 120b, 120c, 120d and 120e.

The central communication unit 110 provides a host computer interface unit 160, a digital I/O data storing unit 140, an identification number setting data storing unit 141, a communication port 150, and a central communication control unit 130. The identification number setting data storing unit 141 also has an identification number storing unit 141a for storing the identification number to be set in the terminal communication units 120a, 120b, 120c, 120d and 120e, and a routing data storing unit 141b for storing routing data for each of the terminal communication units 120a, 120b, 120c, 120d and 120e regarding from the central communication unit 110 to the terminal communication units 120a, 120b, 120c, 120d and 120e.

The each of the terminal communication units 120a, 120b, 120c, 120d and 120e provides an upstream communication port 151, a plurality of downstream communication ports 152a and 152b, a digital I/O port 161, a terminal communication control unit 131, and an identification number designating unit 144.

The upstream communication port 151 in the terminal communication units 120a, 120b, 120c, 120d and 120e is connected with a communication port 150 in the central communication unit 110 and also connected with the upstream communication port 152a and the downstream communication port 152b via the terminal communication control unit 131. Reference numerals indicated in the terminal communication unit 120a are appended to the terminal communication units 120b, 120c, 120d and 120e as the same elements.

Further, the digital I/O port 161 in the terminal communication units 120a, 120b, 120c, 120d and 120e is connected with controlled devices, for example, a sensor, an actuator, etc.

Next, an operation of the host computer 100 in this embodiment will be described below. The host computer 100 sends, to the central communication unit 110, the routing data generated in accordance with a generating method in advance, as an after-mentioned description, regarding from the central communication unit 110 to all of the terminal communication units 120a, 120b, 120c, 120d and 120e, and the identification number to be set in all of the terminal communication units 120a, 120b, 120c, 120d and 120e. The routing data and identification number are stored in the identification number setting data storing unit 141 via a host computer interface unit 160.

Further, the host computer 100 stores an output value from the digital I/O port 161 in all of the terminal communication units 120a, 120b, 120c, 120d and 120e in the digital I/O data storing unit 140 in the central communication unit 110 via the host computer interface unit 160. Digital input values, stored in the digital I/O data storing unit 140 in the central communication unit 110 via the host computer interface unit 160, are checked to thereby confirm the digital input values regarding all of the terminal communication units 120a, 120b, 120c, 120d and 120e.

The central communication unit 110 also provides a terminal type data storing unit 143, and the each of the terminal communication units 120a, 120b, 120c, 120d and 120e provides a terminal type number designating unit 145.

[Central Communication Unit]

Next, an operation of the central communication unit 110 in this embodiment will be described below. The central communication unit 110 transmits and receives data to/from the host computer 100 via the host computer interface unit 160 to transmit and receive the data to/from the terminal communication units 120a, 120b, 120c, 120d and 120e via the communication port 150 controlled by the central communication control unit 130.

The central communication control unit 130 outputs, to the communication port 150, data as an identification number setting packet combined with the routing data and the identification number at every terminal communication unit 120a, 120b, 120c, 120d or 120e, when the routing data and identification number of the respective terminal communication units 120a, 120b, 120c, 120d and 120e are set in the identification number setting data storing unit 141 by the host computer 100. Thereafter, the central communication control unit 130 repeatedly outputs the identification number setting packet of all of the terminal communication units 120a, 120b, 120c, 120d and 120e to the communication port 150. The central communication control unit 130 then receives an identification number setting completion packet indicating a setting completion of the identification number transmitted from the terminal communication unit 120a, 120b, 120c, 120d or 120e to then halt the transmission of the identification number setting data of the sending source among the terminal communication units 120a, 120b, 120c, 120d and 120e.

When a digital output value is set in the digital I/O data storing unit 140, the central communication control unit 130 also outputs, to the communication port 150, data as a digital output packet combined with the identification number in the terminal communication unit 120a, 120b, 120c, 120d or 120e corresponding to the digital output value, which was set, and this digital output value. Further, the central communication control unit 130 receives a digital input packet combined with the identification number of the terminal communication unit 120a, 120b, 120c, 120d or 120e and the digital input value from the communication port 150 to then store the data of digital input packet in the digital I/O data storing unit 140.

The communication port 150 transmits the packet, received from the central communication control unit 130, to the upstream communication port 151 in terminal communication unit 120a to be connected and outputs the packet, received from the upstream communication port 151 in terminal communication unit 120a, to the central communication control unit 130.

[Terminal Communication Unit]

Next, an operation of the terminal communication units 120a, 120b, 120c, 120d and 120e in this embodiment will be described below. The each of the terminal communication units 120a, 120b, 120c, 120d and 120e has the terminal communication control unit 131 which transmits and receives data to/from the controlled devices via the digital I/O port 161, data to/from the central communication unit 110 via the upstream communication port 151 or the other terminal communication unit 120a, 120b, 120c, 120d or 120e, and data to/from the other terminal communication unit 120a, 120b, 120c, 120d or 120e via the downstream communication port 152a or 152b.

When the terminal communication control unit 131 receives the identification number setting packet from the upstream communication port 151, it sets a value as an identification number to be stored in an identification number portion of the identification number setting packet if the least significant number of the data in the routing data portion among the identification number setting packets is "1" indicating that the identification number is set in the corresponding terminal communication unit 120a, 120b, 120c, 120d or 120e. Further, if the least significant number of the data in the routing data portion is "2" indicating the downstream communication port 152a, the terminal communication control unit 131 deletes the value of the least significant number to transmit the remaining data of the routing data portion to the downstream communication port 152a. If the least significant number is "3" indicating the downstream communication port 152b, the terminal communication control unit 131 deletes the value of the least significant number to transmit the remaining data thereof to the downstream communication port 152b.

Further, when the terminal communication control unit 131 receives a digital output packet from the upstream communication port 151, a digital output value of the digital output packet is set in the digital I/O port 161 if the identification number data of the digital output packet is matched with the identification number of the corresponding terminal communication unit 120a, 120b, 120c, 120d or 120e. If it is not matched with the identification number thereof, the terminal communication control unit 131 transmits the digital output packet to the downstream communication ports 152a and 152b.

The terminal communication control unit 131 transmits the digital input packet combined the digital input value with an own identification number to the upstream communication port 151 when the digital input value is varied.

The terminal communication control unit 131 outputs the packet to the upstream communication port 151 when receiving the packet from the downstream communication port 152a or 152b.

Figure 2:
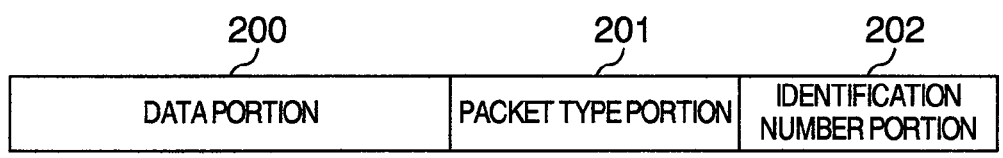
FIG. 2 is an explanatory diagram showing packet format data used for a network communication in the invention.

FIG. 2 shows a packet format to be used for a data communication. The packet format is configured by a data portion 200 corresponding to transmission/reception data, a packet type portion 201 indicating a type of the packet, and an identification number portion 202 indicating the identification number of the terminal communication unit 120a, 120b, 120c, 120d or 120e.

The data portion 200 stores either I/O data of the digital I/O port 161 in the terminal communication unit 120a, 120b, 120c, 120d or 120e, or the routing data of the identification number setting data.

The packet type portion 201 stores "10" when the packet type is the digital input packet, stores "11" when the packet type is the digital output packet, stores "20" when the packet type is the identification number setting packet, stores "30" when the packet type is the identification number setting completion packet, and stores "40" when the packet type is a terminal type number packet. The central communication control unit 130 and terminal communication control unit 131 refer to the packet type portion 201 to determine the type of packet and perform a process for the pieces of data.

The identification number portion 202 stores the identification number to be set in the terminal communication unit 120a, 120b, 120c, 120d or 120e as a sending destination, that is, the identification number of the sending destination terminal communication unit 120a, 120b, 120c, 120d or 120e when the packet is transmitted to the terminal communication unit 120a, 120b, 120c, 120d or 120e from the central communication unit 110. The identification number portion 202 stores the identification number set in the own terminal communication unit 120a, 120b, 120c, 120d or 120e, that is, the identification number of a sending source terminal communication unit 120a, 120b, 120c, 120d or 120e when the packet is transmitted to the central communication unit 110 from the terminal communication unit 120a, 120b, 120c, 120d or 120e.

[Generation of Routing Data]

Figure 3:
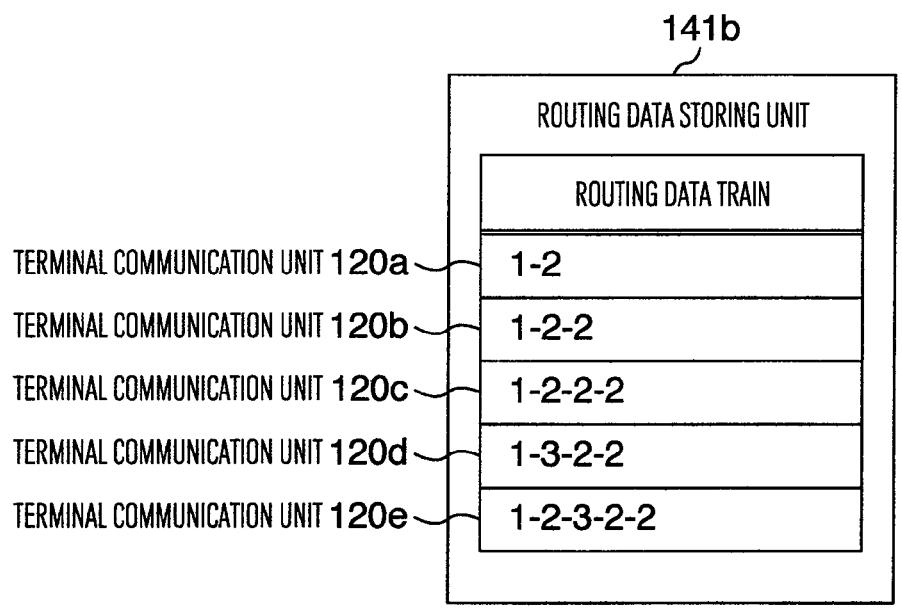
FIG. 3 is an explanatory diagram showing routing data stored in a routing data storing unit in a first embodiment of the invention.

Here, a generating method of the routing data will be described with reference to FIG. 3. The routing data is a sequentially arranged number of the downstream communication ports 152a, 152b in the terminal communication unit 120a, 120b, 120c, 120d or 120e through which the packet passes from the central communication unit 110 as far as the terminal communication unit 120a, 120b, 120c, 120d or 120e.

For example, the terminal communication unit 120a is represented by a number "2" indicating the communication port 150 in the central communication unit 110 and a number "1" indicating a targeted terminal communication unit since the unit 120a in FIG. 1 is connected with the communication port 150 in the central communication unit 110. That is, the routing data becomes "1-2".

The terminal communication unit 120b is represented by a number "2" indicating the communication port 150 in the central communication unit 110, a number "2" indicating the downstream communication port 152a in the terminal communication unit 120b, and a number "1" indicating a targeted terminal communication unit 120b since the terminal communication unit 120b is connected with the downstream communication port 152b in the terminal communication unit 120a. That is, the routing data becomes "1-2-2".

[Setting of Identification Number]

Next, the following description will be concerned with the setting of identification number in the terminal communication units 120a, 120b, 120c, 120d and 120e in FIG. 1 as cited with an example.

Figure 4A:
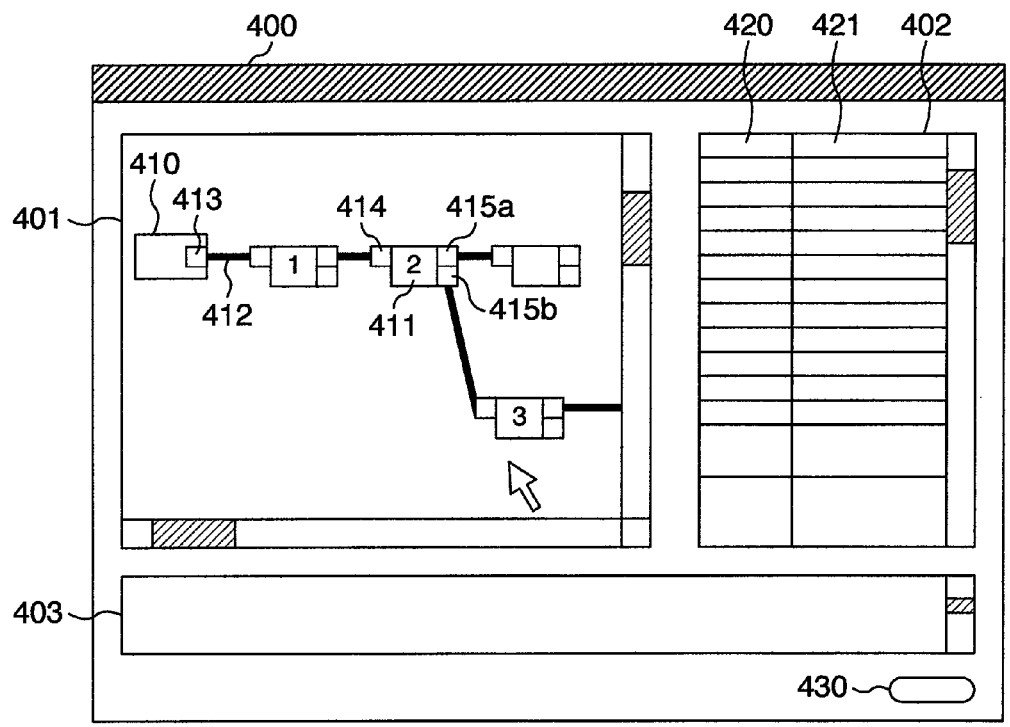
FIG. 4A is an explanatory diagram for a screen display and function of an identification number setting application in the first embodiment.

FIG. 4A shows an example of a display screen on a display regarding an identification number setting application 400 using GUI (Graphical User Interface) used for generating the identification number setting data in the host computer 100.

The display screen of the identification number setting application 400 is configured by a network configuration setting portion 401, a terminal communication unit data displaying portion 402, a process displaying portion 403 for displaying a processing condition of the host computer 100, and an identification number setting data generating button 430.

Further, the network configuration setting portion 401 is configured by a terminal communication unit symbol 411 providing a central communication unit symbol 410, an upstream communication port symbol 414, and downstream communication port symbols 415a, 415b, and a connection condition symbol 412. The upstream communication port symbol 414 in the terminal communication unit symbol 411 is connected with a communication port symbol 413 in the central communication unit symbol 410 by an operation of the system user, and the upstream communication port symbol 414 is connected with either the downstream communication port symbol 415a or 415b in another terminal communication unit symbol 411 by the connection condition symbol 412, so that a network configuration can be generated on a software.

The respective terminal communication unit symbols 411 have a function for setting the identification number in the software, and a designated identification number is displayed on the own symbol.

The terminal communication unit data displaying portion 402 is configured by an identification number displaying portion 420 and a terminal type number displaying portion 421. The identification number is set in the respective communication units 120a, 120b, 120c, 120d and 120e to be able to communicate the host computer 100 with any of the terminal communication units 120a, 120b, 120c, 120d and 120e. Thereafter, a correspondence of the identification number and terminal type of the terminal communication unit 120a, 120b, 120c, 120d or 120e to be able to communicate therewith, is displayed.

Figure 4B:
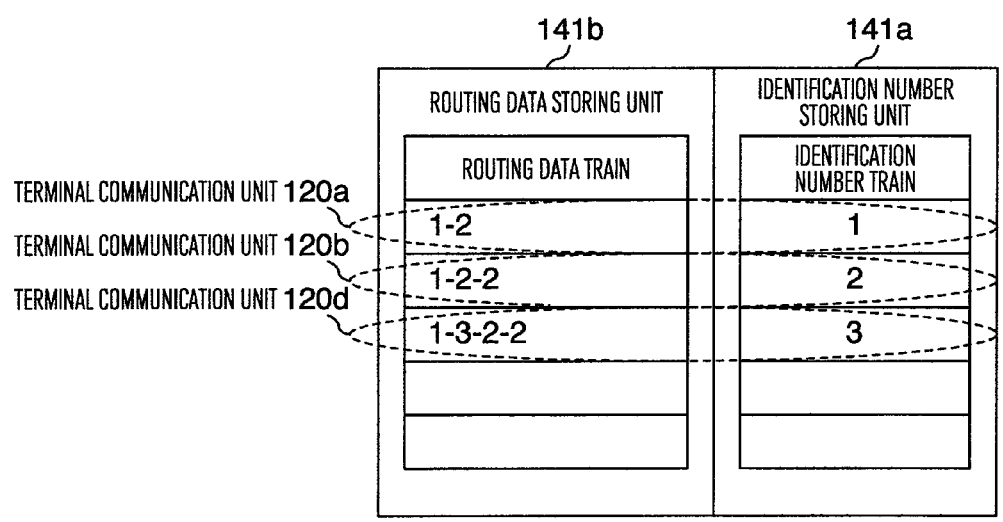
FIG. 4B is an explanatory diagram for the routing data and identification number in the first embodiment.

Here, the identification number setting application 400 generates a network configuration shown in FIG. 4A by the system user to generate the identification number setting data shown in FIG. 4B when depressing the identification number setting data generating button 430 and store in the identification number setting data storing unit 141 in the central communication unit 110 via the host computer interface unit 160.

[System Processing Procedure]

FIG. 5 is an explanatory diagram showing a processing procedure of an entire system when setting the identification number in the terminal communication units 120a, 120b and 120d, in this embodiment. The detailed processing procedure will be described on the basis of the identification number setting data as generated above in FIG. 4B.

In the following example, it is assumed that the terminal communication unit 120d is not connected with the network in the beginning. The host computer 100 generates the identification number setting data by the operation of identification number setting application 400 at a process 500. The generated identification number setting data (as a table) is stored in the identification number setting data storing unit 141 in the central communication unit 110 via the host computer interface unit 160 at a process 510.

The central communication unit 110 generates an identification number setting packet for each of the terminal communication units 120a, 120b and 120d on the basis of the identification number setting data which was set, or three identification number setting packets at process 511. In this example, since the central communication unit 110 provides one communication port 150 alone, a value of the least significant number in the routing data is "2".

First, the central communication unit 110 transmits the identification number setting data (first line in FIG. 4B) to the terminal communication unit 120a, or a first identification number setting packet as indicated by the identification number "1" and the routing data "1-2" thereto. The central communication control unit 130 deletes the value of the least significant number from the routing data in the first identification number setting packet to then send the remaining of first identification number setting packet to the communication port 150 at a communication 550.

The terminal communication unit 120a receives the first identification number setting packet via the upstream communication port 151. In this case, the routing data in the first identification number setting packet is "1", therefore, the value of the least significant number is "1". To this end, the identification number "1" is stored in the identification number designating unit 144 in the terminal communication unit 120a at a process 520.

The terminal communication unit 120a transmits the identification number setting completion packet to the central communication unit 110 via the upstream communication port 151 at a communication 590. The central communication unit 110 stores the identification number setting completion data in the identification number setting completion data storing unit 142 at every time of receiving the identification number setting completion packet to then halt the transmission of identification number setting data of the terminal communication unit 120a, 120b or 120d as the sending source of the received identification number setting completion packet.

The central communication unit 110 transmits the identification number setting data (second line in FIG. 4B) to the terminal communication unit 120b, or a second identification number setting packet as indicated by the identification number "2" and the routing data "1-2-2" thereto. The central communication control unit 130 deletes the value of the least significant number from the routing data in the second identification number setting packet to then send the remaining of second identification number setting packet to the communication port 150 at a communication 560.

The terminal communication unit 120a receives the second identification number setting packet via the upstream communication port 151. In this case, the routing data in the second identification number setting packet is "1-2", therefore, the value of the least significant number is "2". To this end, the terminal communication unit 120a deletes the value of the least significant number to send the remaining of second identification number setting packet to the downstream communication port 152a at a communication 561.

The terminal communication unit 120b receives the second identification number setting packet via the upstream communication port 151. In this case, the routing data in the second identification number setting packet is "1", therefore, the value of the least significant number is "1". To this end, the identification number "2" is stored in the identification number designating unit 144 in the terminal communication unit 120b at a process 530.

The terminal communication unit 120b transmits the identification number setting completion packet to the central communication unit 110 via the upstream communication port 151 at a communication 591.

The central communication unit 110 transmits the identification number setting data (third line in FIG. 4B) to the terminal communication unit 120d, or a third identification number setting packet as indicated by the identification number "2" and the routing data "1-3-2-2" thereto. The central communication control unit 130 deletes the value of the least significant number from the routing data in the third identification number setting packet to then send the remaining of third identification number setting packet to the communication port 150 at a communication 570.

The terminal communication unit 120a receives the third identification number setting packet via the upstream communication port 151. In this case, the routing data in the third identification number setting packet is "1-3-2", therefore, the value of the least significant number is "2". To this end, the terminal communication 120a deletes the value of the least significant number from the routing data to then send the remaining of third identification number setting packet to the downstream communication port 152a at a communication 571.

The terminal communication unit 120b receives the third identification number setting packet via the upstream communication port 151. In this case, the routing data in the third identification number setting packet is "1-3", therefore, the value of the least significant number is "3". To this end, the terminal communication unit 120b deletes the value of the least significant number from the routing data to send the remaining of third identification number setting packet to the downstream communication port 152b at a communication 572.

The terminal communication unit 120d cannot receive the third identification number setting packet since it is not connected with the network at a communication 572a.

The host computer 100 refers to the identification number setting completion data storing unit 142 via the host computer interface unit 160 at a process 512 to start a communication between the terminal communication units 120a and 120b by using the setting completed identification numbers "1" and "2" at a process 501.

The central communication unit 110 transfers cyclically and repeatedly the third identification number setting packet corresponding to an unsetting identification number "3" to the communication port 150 at a process 513, communication 570, communication 571 and communication 572a.

The terminal communication unit 120d is connected with the network to receive the cyclically sent third identification number setting packet from the upstream communication port 151 at a communication 572b. In this case, the routing data in the third identification number setting packet is "1", therefore, the value of the least significant number is "1". To this end, the identification number "3" is stored in the identification number designating unit 144 in the terminal communication unit 120d at a process 540.

The terminal communication unit 120d transmits the identification number setting completion packet to the central communication unit 110 via the upstream communication port 151 at a communication 592.

The host computer 100 refers to the identification number setting completion data storing unit 142 via the host computer interface unit 160 to then start the communication among the terminal communication units 120a, 120b and 120d by using the setting completed identification numbers "1", "2" and "3", at a process 502.

According to the above-mentioned operation, the identification number can be set in the plurality of terminal communication units 120a, 120b, 120c, 120d and 120e, and the data transmission and reception can be performed between the host computer 100 and the digital I/O port 161 in the plurality of terminal communication units 120a, 120b, 120c, 120d and 120e.

According to the above-mentioned method in this embodiment, the identification number can be set in all of the terminal communication units 120a, 120b, 120c, 120d and 120e on the basis of the routing data of the network, without using a unique address, switch, ROM, etc.

Further, the setting and change of the identification number for all of the terminal communication units 120a, 120b, 120c, 120d and 120e can be performed with centralization from the host computer 100.

In this way, it is not required to assign the unique address on manufacturing the system. Further, it is not required to individually set and change the identification number by using the switch, ROM, etc when incorporating the network I/O system in a machine. Therefore, a competitive assignment of the identification numbers can be prevented from mistaking the setting of switch, ROM, etc.

In the configuration shown in FIG. 1, the central communication unit 110 provides the terminal type data storing unit 143 and each of the terminal communication units 120a, 120b, 120c, 120d and 120e provides the terminal type number designating unit 145, in this embodiment. The each of the terminal communication units 120a, 120b, 120c, 120d and 120e outputs, to the upstream communication port 151, the terminal type packet including the terminal type number and identification number to be stored in the terminal type number designating unit 145 when setting the identification number.

The each of the terminal communication units 120a, 120b, 120c, 120d and 120e receives the terminal type packet from the downstream communication port 152a or 152b to output to the upstream communication port 151. The central communication unit 110 receives the terminal type packet from the communication port 151 to store the terminal type of all of the terminal communication units 120a, 120b, 120c, 120d and 120e in the terminal type data storing unit 143.

The host computer 100 refers to the terminal type number, stored in the terminal type data storing unit 143 in the central communication unit 110, of the terminal communication units 120a, 120b, 120c, 120d and 120e to then confirm the terminal type of the terminal communication units 120a, 120b, 120c, 120d and 120e. According to the above-mentioned method in this embodiment, the host computer 100 can confirm the terminal type, a sort of which is expected by the terminal communication unit 120a, 120b, 120c, 120d or 120e connected with the network.

Second Embodiment

A second embodiment of the invention will be described below. A system configuration of the second embodiment is the same as that of the first embodiment shown in FIG. 1.
[Terminal Communication Unit]

An operation of the terminal communication units 120a, 120b, 120c, 120d and 120e in this embodiment will be described below. The each of the terminal communication units 120a, 120b, 120c, 120d and 120e generates a routing recognition packet by the terminal communication control unit 131. The terminal communication control unit 131 in the terminal communication units 120a, 120b, 120c, 120d and 120e transmits the routing recognition packet to the central communication unit 110 via the upstream communication port 151 or to other terminal communication unit 120a, 120b, 120c, 120d or 120e, and also receives the routing recognition packet from the terminal communication unit 120a, 120b, 120c, 120d or 120e via the downstream communication port 152a or 152a in the terminal communication unit 120a, 120b, 120c, 120d or 120e.

The terminal communication control unit 131 transmits the routing recognition packet, in which the data portion 200 (FIG. 2) is "1", to the upstream communication port 151 when the upstream communication port 151 is connected with the network. In the case of entering the routing recognition packet into the terminal communication control unit 131 from either the downstream communication port 152a or 152b, the terminal communication control unit 131 appends a value "2", for example, indicating the downstream communication port 152a, to the ending of data portion 200 (FIG. 2) of the routing recognition packet to transmit to the upstream communication port 151 if the routing recognition packet is entered from the downstream communication port 152a. In contrast, the terminal communication control unit 131 appends a value "3", for example, indicating the downstream port 152b, to the ending of data portion 200 thereof to transmit to the upstream communication port 151 if the routing recognition packet is entered from the downstream communication port 152b.

In the central communication unit 110, the central communication control unit 130 appends a value "2", for example, indicating the communication port 150, to the ending of data portion 200 in the routing recognition packet received from the communication port 150 to store in the routing data storing unit 141b in the identification number setting data storing unit 141.

The host computer 100 refers to the routing recognition data stored in the routing data storing unit 141b in the identification number setting data storing unit 141 via the host computer interface unit 160 to thereby recognize the routing data as far as the terminal communication units 120a, 120b, 120c, 120d and 120e.

[Routing Recognition Data]

Figure 6:
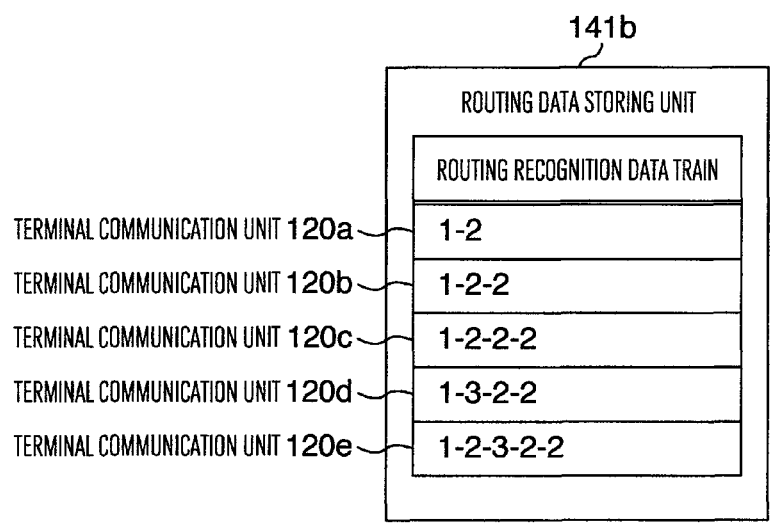
FIG. 6 is an explanatory diagram for routing recognition data to be stored in the routing data storing unit in a second embodiment of the invention.

Here, a generating method of the routing recognition data will be described below. FIG. 6 is an explanatory diagram showing data stored in the routing data storing unit 141b. The routing recognition data is transmitted as the routing recognition packet from the terminal communication units 120a, 120b, 120c, 120d and 120e to be appended, in the order, with the port numbers of either downstream communication port 152a or 152b of the terminal communication unit 120a, 120b, 120c, 120d or 120e through which the routing recognition data is passed as far as the central communication unit 110. In this way, the routing data is generated.

For example, since the terminal communication unit 120a in FIG. 1 is connected with the communication port 150 in the central communication unit 110, the routing recognition packet transmitted from the terminal communication unit 120a has a value "1" in an initial condition. When the routing recognition packet is entered into the central communication unit 110, the central communication control unit 130 appends a value "2" indicating the communication port 150 to the ending of data portion 200. That is, the routing recognition data becomes "1-2".

Further, since the terminal communication unit 120b is connected with the downstream communication port 152b in the terminal communication unit 120a, the routing recognition packet transmitted from the terminal communication unit 120b has a value "1" in the initial condition. When the routing recognition packet is entered into the terminal communication unit 120a, the terminal communication control unit 131 appends a value "2" indicating the downstream communication port 152a to the ending of data portion 200 to then transmit to the upstream communication port 151. When the routing recognition packet is entered into the central communication unit 110, the central communication control unit 130 appends a value "2" indicating the communication port 150 to the ending of data portion 200. That is, the routing recognition data becomes "1-2-2".

The central communication unit 110 receives the routing recognition data from all of the terminal communication units 120a, 120b, 120c, 120d and 120e to then store in the routing data storing unit 141b as shown in FIG. 6. Therefore, the host computer 100 refers to the routing data storing unit 141b via the host computer interface unit 160 to be able to recognize all of the routing data as far as the terminal communication units 120a, 120b, 120c, 120d and 120e.

Further, the each of the terminal communication units 120a, 120b, 120c, 120d and 120e appends a terminal type number to be stored in the terminal type number designating unit 145 to the identification number portion 202 (FIG. 2) in the routing recognition packet to then be transmitted. Therefore, the central communication unit 110 performs simultaneously storing the routing recognition data in accordance with the above-mentioned operation and storing the terminal type number in the terminal type data storing unit 143, so that the host computer 100 can simultaneously recognize the routing data and terminal type number of the terminal communication units 120a, 120b, 120c, 120d and 120e.

[Setting of Identification Number]

Figure 7:
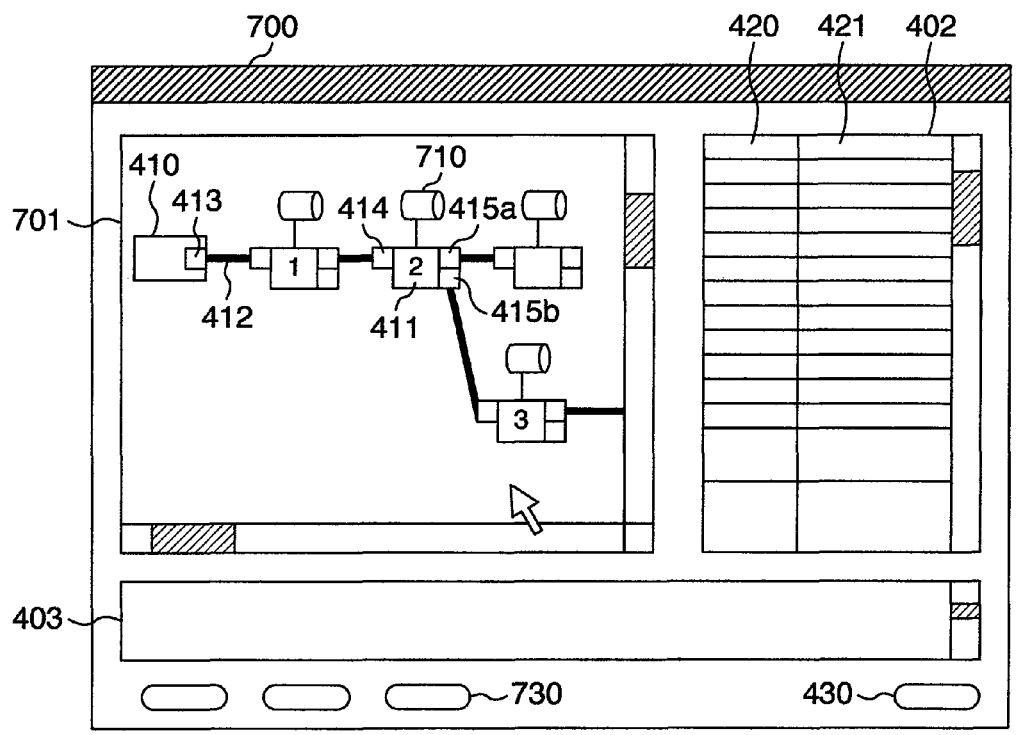
FIG. 7 is an explanatory diagram for a screen display and function of the identification number setting application in the second embodiment.

FIG. 7 is a diagram showing an example of a display screen. This display screen is configured such that the host computer 100 recognizes a configuration of the entire network on the basis of the routing data and terminal type number recognized by the above-mentioned method to represent a network configuration by the GUI.

The display screen of a network configuration display setting application 700 is configured by a network configuration displaying portion 701, a terminal communication unit data displaying portion 402, a process displaying portion 403, an identification number setting data generating button 430, and an identification number automatic setting button 730.

The network configuration displaying portion 701 is configured by the terminal communication unit symbol 411 providing the central communication unit symbol 410, the upstream communication port symbol 414 and the downstream communication port symbols 415a, 415b; a controlled device symbol 710 representing the controlled device connected with the terminal communication units 120a, 120b, 120c, 120d and 120e; and the connection condition symbol 412. The upstream communication port symbol 414 in the terminal communication unit symbol 411 is connected with either the communication port symbol 413 in the central communication unit symbol 410 or the downstream communication port 415a, 415b in another terminal communication unit symbol 411 by the connection condition symbol 412. In this way, the network configuration displaying portion 701 has a function for automatically displaying the network configuration recognized by the host computer 100.

Each of the terminal communication unit symbols 411 has a function for setting the identification number in the software, and a designated identification number is displayed on itself.

The terminal communication unit data displaying portion 402 is configured by the identification number displaying portion 420 and the terminal type number displaying portion 421. The identification number is set in the terminal communication units 120a, 120b, 120c, 120d and 120e to be able to communication the host computer 100 with any of the terminal communication units 120a, 120b, 120c, 120d and 120e. Thereafter, a correspondence of the identification number and terminal type of the terminal communication unit 120a, 120b, 120c, 120d or 120e is displayed.

The identification number setting data generating button 430 is depressed by the system user, after setting the identification number in the terminal communication unit symbol 411 of the network configuration displayed on the network configuration displaying portion 701, to thereby generate the identification number setting table and store in the host computer 100.

The identification number automatic setting button 730 is depressed by the system user, after the network configuration is displayed on the network configuration displaying portion 701 to automatically set the identification number in the terminal communication unit symbol 410 by a process of the software.

According to the method in the second embodiment, the routing between the network configuration and the controlled device is recognized dynamically to be displayed on the network configuration display setting application 700 in the host computer 100, so that a confirmation work of the system configuration can be made easily for the system user.

In consequence, a man-caused mistake such as a connection mistake between the terminal communication units 120a, 120b, 120c, 120d, 120e and the controlled device, which occurs at a time of configuring, adding and changing the system, can be reduced.

Further, it is possible to set the identification number of the terminal communication units 120a, 120b, 120c, 120d and 120e without setting the routing data by the manual, therefore, the configuration, addition and change of the system can be made easily.

Here, the network I/O system in the invention will be described with a case where it is applied to a chip mounter as a field of industrial machinery. The chip mounter is used for manufacturing printed-wiring boards, and electronic parts are arranged and mounted on the printed-wiring board to make a printed circuit board. Of the chip mounters, a device of type so-called modular mounter provides a dedicated parts supply work unit gathered together with a number of parts supply devices and a plurality of part mounting head work units. This modular mounter controls the entire chip mounters by controlling data I/O of the plurality of controlled devices in the respective work units. Further, the modular mounter changes detachably the respective work units to the chip mounter itself depending on the type of electronic parts, the printed circuit board, etc. to be used, and this modular mounter is changed from a configuration of the plural work units to a different configuration of the plural work units to be used. Therefore, in the control of chip mounter using the network I/O system, communication identification numbers which are not overlapped with each other, are appended respectively to the controlled devices in the respective work units. In this way, it is required to prevent a setting mistake of the identification number on manufacturing the work unit, and an overlapping and setting mistake of the identification number caused by a mounting error on detachably changing the work unit and a resetting the respective identification numbers. In the chip mounter, the central communication unit 110 may be mounted on the host computer 100 used for control, and the plurality of terminal communication units 120a, 120b, 120c, 120d and 120e may also be mounted on a modular unit or the work unit.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network configuration method performed by:
a host computer;
a central communication unit including a host computer interface unit, a digital I/O data storing unit, an identification number setting data storing unit, an identification number setting completion data storing unit, at least one communication port, and a central communication control unit; and
at least first and second terminal communication units each including at least one upstream communication port, a plurality of downstream communication ports, at least one digital I/O port, a terminal communication control unit, and an identification number designating unit,
wherein an upstream communication port in the first terminal communication unit is connected with the communication port in the central communication unit, and a downstream communication port in the first terminal communication unit is connected with an upstream communication port in the second terminal communication unit,
the network configuration method comprising the steps of:
storing, by the host computer, first identification number setting data for the first terminal communication unit, and second identification number setting data for the second terminal communication unit, in the identification number setting data storing unit of the central communication unit;
the first identification number setting data comprising first identification number assigned uniquely to the first terminal communication unit, and first route information indicating a route of information sent from the central communication unit to the first terminal communication unit, the first route information including no port numbers of any downstream communication ports of the first terminal communication unit,
the second identification number setting data comprising second identification number assigned uniquely to the second terminal communication unit, and second route information indicating a route of information sent from the central communication unit to the second terminal communication unit, the second route information including a port number of the down stream communication port of the first terminal communication unit which is connected to the upstream communication port of the second terminal communication unit;
transmitting, by the central communication unit, the first and second identification number setting data stored in the identification number setting data storing unit through the communication port of the central communication unit to the connected upstream communication port of the first terminal communication unit;
when the first and second identification number setting data is received by the first terminal communication unit, determining whether the port number of the downstream communication port of the first terminal communication unit is included,
when no port number is included in the received identification number setting data, which is the first identification number setting data, storing the first identification number included in the first identification number setting data in the identification number designating unit of the first terminal communication unit, and transmitting to the central communication unit, first setting completion data indicating that the first identification number is stored, when the first setting completion data is received by the central communication unit, stopping the transmitting of the first identification number setting data, and when the port number of the downstream communication port of the first terminal communication unit is included in the received identification number setting data, which is the second identification number setting data, deleting the port number of the downstream communication port of the first terminal communication unit from the received second identification number setting data, and sending the second identification number setting data to the second terminal communication unit through the downstream communication port of the first terminal communication unit; and when the second identification number setting data from the first terminal communication unit is received by the second terminal communication unit, determining whether a port number of a corresponding downstream communication port of the second terminal communication unit is included, when no port number is included in the received second identification number setting data, storing the second identification number included in the second identification number setting data in the identification number designating unit of the second terminal communication unit through the first terminal communication unit, and transmitting to the central communication unit, second setting completion data indicating that the second identification number is stored, and when the second setting completion data is received by the central communication unit, stopping the transmitting of the second identification number setting data.

2. The method according to claim 1 wherein the identification number setting data storing unit includes:
an identification number storing unit for storing the first and second identification numbers; and
a routing data storing unit for storing the first and second route information.

3. The method according to claim 1 wherein:
each of the first and second terminal communication units includes a terminal type number designating unit for storing terminal type numbers uniquely assigned to every type of controlled devices connected with the digital I/O port;
each of the first and second terminal communication units combines a terminal type number stored in the terminal type number designating unit with the identification number stored in the identification number designating unit to transmit to the upstream communication port and transmit the received terminal type number and identification number to the upstream communication port without change if the combined the terminal type number with the identification number is received from the downstream communication port;
the central communication unit stores terminal type numbers of the first and second terminal communication units for every identification number in the terminal type data storing unit in accordance with the received terminal type number and identification number from the communication port; and
the host computer recognizes a type of controlled devices connected with the respective first and second terminal communication units in accordance with the terminal type numbers number stored in the terminal type data storing unit in the central communication unit.

* * * * *

UNITED STATES PATENT AND TRADEMARK OFFICE
CERTIFICATE OF CORRECTION

PATENT NO. : 8,468,221 B2
APPLICATION NO. : 12/784166
DATED : June 18, 2013
INVENTOR(S) : Takashi Saegusa et al.

It is certified that error appears in the above-identified patent and that said Letters Patent is hereby corrected as shown below:

Title Page, Item "(73) Assignee", the assignee should read -- Hitachi High-Tech Instruments Co., Ltd. -- rather than "Hitachi High-Technologies Corporation".

Signed and Sealed this
Twenty-second Day of October, 2013

Teresa Stanek Rea
*Deputy Director of the United States Patent and Trademark Office*